Feb. 8, 1944.  F. G. PURINTON  2,341,333
PLASTIC FILM SPOOL FOR CAMERAS
Filed Oct. 16, 1941
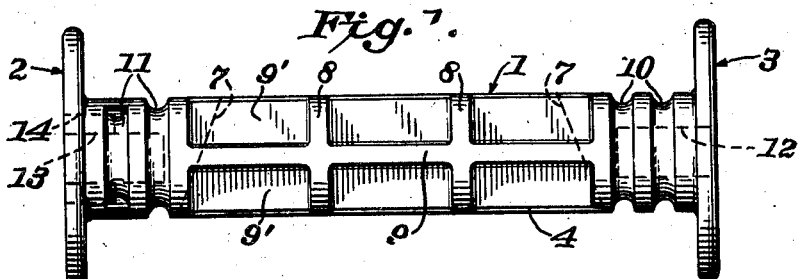
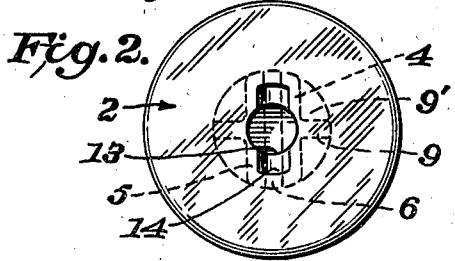
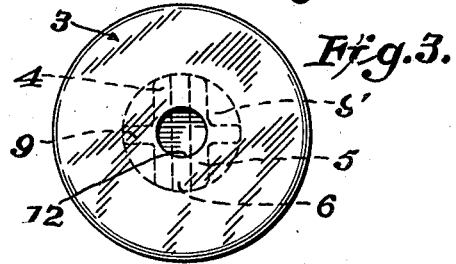
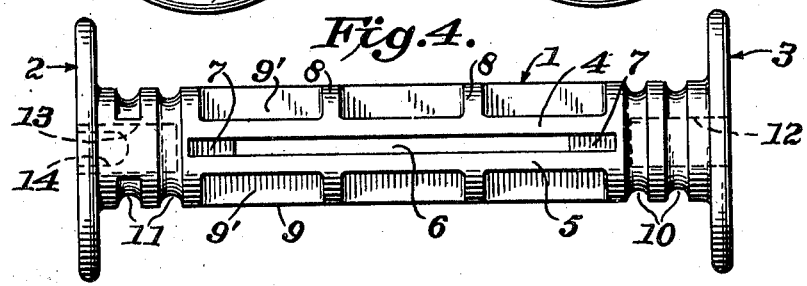
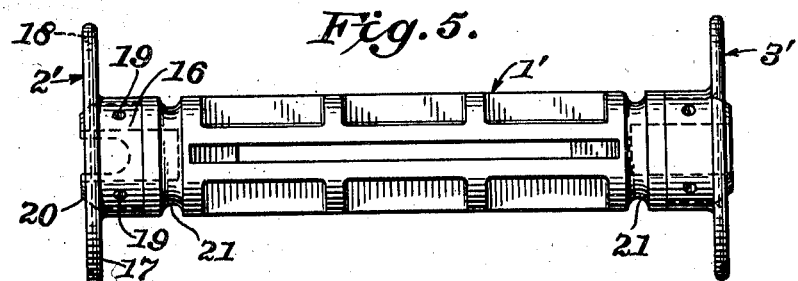
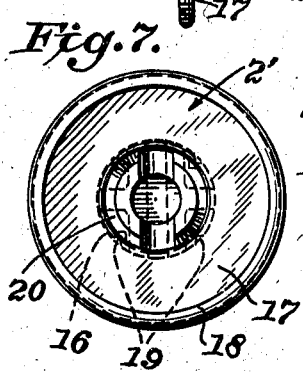
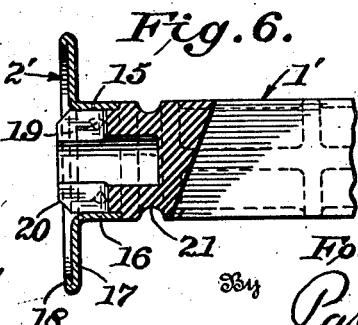
Inventor:
Forrest G. Purinton,
By Parker Cook
Attorney.

Patented Feb. 8, 1944

2,341,333

UNITED STATES PATENT OFFICE 2,341,333

PLASTIC FILM SPOOL FOR CAMERAS

Forrest G. Purinton, Waterbury, Conn., assignor to The Patent Button Company, Waterbury, Conn., a corporation of Connecticut Application October 16, 1941, Serial No. 415,294

2 Claims. (Cl. 242—70.)

My invention relates to a new and useful improvement in spools for roll films, and has for an object to provide a spool that may be molded from a thermo-setting or thermoplastic molding compound, hard rubber or any other desirable plastic material which may be readily molded in an economical manner.

Still another object of the invention is to provide a film spool for cameras which may be molded in one piece, which will be light in weight and economical to manufacture.

Still another object of the invention is to provide a plastic molded film spool wherein the spool may be reinforced by the use of metal end pieces, if so desired.

Still another object of the invention is to provide a plastic molded film spool which will be extremely light in weight but at the same time so constructed that it will be relatively strong and withstand the strain that is usually put on a spool of this kind.

Heretofore, camera film spools have often been made of stamped metal which is relatively expensive, and may have a tendency to rust, or they are sometimes made with a wooden core and metal ends, and if so the wood may have a tendency to swell and thus spoil any accuracy with which the spool is made.

Furthermore, film spools with wooden cores have a tendency to splinter, and these splinters or dust liberated in the camera prove troublesome and may cause spots both on the negatives and on the prints.

Still another object of the invention is to provide a molded plastic spool which will be extremely accurate in construction, thus assuring the proper and accurate releasing of the film from the spool. Also, the spool is relatively light in weight, as it is of a skeleton-like construction, the plastic material being dispensed with wherever possible.

With these and other objects in view, the invention consists in certain new and novel arrangements and combination of parts as will be hereinafter more fully explained and pointed out in the claims.

Referring now to the drawing showing one preferred and modified form,

Fig 1 is an enlarged side elevation;
Fig. 2 is a left-end view;
Fig. 3 is a right-end view;
Fig. 4 is an enlarged side elevation at a 90° turn from Fig. 1;
Fig. 5 is an enlarged side elevation similar to Fig. 4 of a slightly modified form showing the ends reinforced with metal;
Fig. 6 is a fragmentary sectional view of the left portion of Fig. 5;
Fig. 7 is a left-end view thereof; and
Fig. 8 is a cross-sectional view through the central portion of the spool.

Referring now to the drawing and for the moment to Figs. 1 to 4, showing the preferred embodiment of my improved film spool, there may be noticed the spindle 1 and respective ends 2 and 3, which are integral and are of disc shape. As heretofore mentioned, the spool is to be molded from any desired plastic molding material; as I have found a number of the plastics to be relatively cheap, quick setting, and relatively strong.

Furthermore, a plastic spool is desirable, in that it may be accurately molded, will retain its shape and will not liberate any splinters or dust.

To economize on material and also to keep the weight as low as possible to thus provide for cheaper delivery costs, the spool might be said to be of a skeleton nature; that is (glancing for the moment at Fig. 4), there will be seen what might be termed a longitudinally central rib 4 and a similar lower one 5 between which extends the slot or kerf 6, through which latter the end of the film or the paper backing of the film (neither of which is shown) is to be inserted. These ribs 4 and 5 are equally spaced from the center so that as may be seen in Fig. 4, the kerf 6 extends centrally of the spindle axis.

As may be noticed, at the opposite ends of the kerf there are the angular walls 7 which will guide the film while being inserted within the kerf 6.

Circumferentially of the spindle may be seen the ribs 8 and likewise there may be seen as illustrated in Fig. 1 a longitudinally extending rib 9 which connects and merges with these circumferential ribs 8 just mentioned. By providing a plurality of these ribs 8 and 9 there are formed resultant pockets 9' between the circumferential and longitudinally extending ribs. Thus, there is formed a spindle of skeleton nature, which is well braced throughout its length, and at the same time utilizes but a minimum of the plastic material.

At the same time, the desired circumference of the spool is retained so that the film may be wound off the one spool on to the other.

To additionally lighten the spool it will be noticed that besides the ribs and resultant pockets heretofore mentioned, the circumference is grooved as at 10 at the one end and as at 11 at the other end, thus still further economizing on material.

The ends 2 and 3 are in the form of circular discs and tend to guide the film in its reeling action onto or off of the spool. I have found that these integral ends have sufficient material in cross section to withstand the ordinary uses to which they are put, but if it is desired to substitute metal for these ends, it may be done as will be shortly mentioned.

One end of the spool is concentrically cored as at 12 for the reception of a pintle, which is located in the camera, and the other end is likewise cored as at 13, and also is provided with an internal key slot 14 which is adapted to receive the cross bar of the key in the camera which actuates the spool when the film is to be moved in front of the lens.

Referring to the modified form as illustrated in Figs. 5 to 8, it will be noticed that the construction of the core or spindle is substantially the same, but rather than molding the flanges I utilize metal end pieces 2' and 3', which will be molded with and anchored to the respective ends of the spindle.

Referring to Fig. 6 for the moment, and understanding that a description of the one end is a description of the other, it will be seen that the end of the spindle is slightly reduced at 15 and a metal end piece 21 having the circular hub 16, is molded therein, and the disc body portion 17 may be turned in upon itself as at 18.

The hub portion 15 may be perforated or indented as at 19 so that the same will be securely anchored upon the plastic spindle during the molding operation.

The extreme end 20 of the spindle may be slightly bevelled to give a finished appearance to the spool.

The spindle 1' per se is cored and ribbed in the same manner as the preferred form with the minor exception that there is only one circumferential groove 21 near its opposite ends rather than two as in the preferred form, as the metal hub prevents the formation of the two grooves.

It will be understood that these metal end pieces will be positioned in the molds before the molds are closed, so that they are molded with the spindle and become substantially an integral part thereof.

From the foregoing it will be seen that I have provided a plastic spool for roll films to be used in cameras, which spool is relatively light in weight being substantially of skeleton form; will be accurate in construction, and at the same time will be sufficiently strong to withstand the usage to which it is to be put. Also, the end pieces may be formed of plastic as an integral part of the spindle or if so desired, metal end pieces may be molded right on the respective ends of the spindle and thus provide reinforced end portions.

It will also be seen that by using a plastic spindle with metal ends, which latter are provided with relatively long hubs, the walls about the concentric openings in the ends of the spindle are well reinforced with metal to thus prevent these walls from fracturing when winding or unwinding the spool in the camera.

I am aware that it is old in the art to make spools of plastic material, and I do not claim my invention broadly as such, but what I do claim and desire to secure by Letters Patent is:

1. A film spool including a plastic spindle having disk like ends, the said spindle having two longitudinal ribs equally spaced from the longituddinal axis of said spindle to provide an opening for the end of a film backing, the two said ribs terminating short of both the ends of the spindle, further coextensively extending longitudinal ribs extending perpendicular with respect to the first mentioned ribs and merging therewith, circumferential ribs also formed on said spindle and merging with the aforementioned ribs and the outer edges of all of said ribs defining the circumference of the spindle, the circumferential ribs being in spaced relation with each other to thus form resultant pockets with the longitudinal ribs throughout the length of the spindle, the said spindle provided at its opposite ends with concentric chambers and one of the ends also provided with a transverse extending slot adapted to receive the cross bar of a key of a camera and oppositely arranged angularly formed walls at the ends of the opening between the first two mentioned longitudinal ribs to accurately guide the film backing through said opening.

2. A film spool including a plastic spindle, the said spindle having two longitudinal ribs equally spaced from the longitudinal axis of said spindle to provide an opening for the end of a film backing, the two said ribs terminating short of both the ends of the spindle, further coextensively extending longitudinal ribs extending perpendicular with respect to the first mentioned ribs and merging therewith, circumferential ribs also formed on said spindle and merging with the aforementioned ribs and the outer edges of all of said ribs defining the circumference of the spindle, the circumferential ribs being in spaced relation with each other to thus form resultant pockets with the longitudinal ribs throughout the length of the spindle, the said spindle provided at its opposite ends with concentric chambers and one of the ends also provided with a transverse extending slot adapted to receive the cross bar of a key of a camera and oppositely arranged angularly formed walls at the ends of the opening between the first two mentioned longitudinal ribs to accurately guide the film backing through said opening, and disk like metal end pieces anchored at the respective ends of said spindle.

FORREST G. PURINTON.